United States Patent
Tao et al.

(10) Patent No.: US 11,997,711 B2
(45) Date of Patent: May 28, 2024

(54) CONTENTION WINDOW SIZE ADJUSTMENT FEEDBACK

(71) Applicant: Nokia Technologies Oy, Espoo (FI)

(72) Inventors: Tao Tao, Shanghai (CN); Karol Schober, Helsinki (FI); Timo Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 387 days.

(21) Appl. No.: 17/601,686

(22) PCT Filed: May 2, 2019

(86) PCT No.: PCT/CN2019/085417
§ 371 (c)(1),
(2) Date: Oct. 5, 2021

(87) PCT Pub. No.: WO2020/220376
PCT Pub. Date: Nov. 5, 2020

(65) Prior Publication Data
US 2022/0167396 A1 May 26, 2022

(51) Int. Cl.
*H04W 72/04* (2023.01)
*H04W 74/00* (2009.01)

(52) U.S. Cl.
CPC .................... *H04W 74/008* (2013.01)

(58) Field of Classification Search
CPC ........... H04W 74/008; H04W 74/0808; H04W 72/04; H04W 72/14; H04W 80/02;
(Continued)

(56) References Cited

U.S. PATENT DOCUMENTS 9,729,295 B2 * 8/2017 Zhang ................... H04L 1/1861
2019/0007972 A1 1/2019 Gou et al.
(Continued)

FOREIGN PATENT DOCUMENTS

CN 109314615 A 2/2019
WO 2017/026937 A1 2/2017

OTHER PUBLICATIONS

Extended European Search Report received for corresponding European Patent Application No. 19927187.5, dated Nov. 17, 2022, 8 pages.

(Continued)

*Primary Examiner* — Wei Zhao
(74) *Attorney, Agent, or Firm* — Harrington & Smith

(57) ABSTRACT

Embodiments of the present disclosure relate to apparatuses, methods and computer readable storage media for contention window size (CWS) adjustment feedback. The first device comprises at least one processor; and at least one memory including computer program codes; the at least one memory and the computer program codes are configured to, with the at least one processor, cause the device at least to receive at least one transport block from a second device on a predetermined bandwidth part for a transmission from the second device to the first device, the at least one transport block transmitted in a set of subbands of the predetermined bandwidth part; generate a feedback based on a set of reception states of the at least one transport block in the set of subbands; and transmit the feedback to the second device so that the second device adjusts a contention window size (CWS) for a further transmission from the second device to the first device. In this way, a feedback corresponding to interference conditions with a certain subband may be provided for the CWS adjustment and the signalling overhead is significantly reduced.

19 Claims, 4 Drawing Sheets

(58) Field of Classification Search
CPC ... H04W 52/365; H04W 16/14; H04W 74/08; H04L 1/1835; H04L 1/1819; H04L 1/183
See application file for complete search history.

(56) References Cited

U.S. PATENT DOCUMENTS

2020/0100286 A1* 3/2020 Xu .................... H04L 1/187
2020/0260486 A1* 8/2020 Zhou .................. H04L 1/1819

OTHER PUBLICATIONS

"Feature Lead's Summary on Channel Access Procedures", 3GPP TSG RAN WG1#95, R1-1813994, Agenda: 7.2.2.4.1, Nokia, Nov. 12-16, 2018, 22 pages.
"Feature Lead's Summary #2 on Channel Access Procedures", 3GPP TSG RAN WG1 Meeting #96bis, R1-1905766, Agenda: 7.2.2.2.1, Nokia, Apr. 8-12, 2019, 21 pages.
Office action received for corresponding Indian Patent Application No. 202147054813, dated Jun. 13, 2022, 6 pages.
"Efficient Sidelink CSI Feedback Mechanism for Groupcast NR-V2X", 3GPP TSG-RAN WG1 Meeting#95, R1-1812408, Agenda: 7.2.4.1.2, Fujitsu, Nov. 12-16, 2018, pp. 1-6.
"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.
"Coexistence and channel access for NR unlicensed band operations", 3GPP TSG RAN WG1 Meeting #96bis, R1-1903928, Agenda: 7.2.2.2.1, Huawei, Apr. 8-12, 2019, 20 pages.
"Channel access procedures for NR unlicensed", 3GPP TSG RAN WG1 Meeting #96Bis, R1-1904999, Agenda: 7.2.2.2.1, Qualcomm Incorporated, Apr. 8-12, 2019, pp. 1-16.
"Channel access and co-existence for NR-U operation", 3GPP TSG RAN WG1 Meeting #97, R1-1906646, Agenda: 7.2.2.2.1, Nokia, May 13-17, 2019, 12 pages.
International Search Report and Written Opinion received for corresponding Patent Cooperation Treaty Application No. PCT/CN2019/085417, dated Jan. 23, 2020, 9 pages.
"Contention window size adaptation for DL LBT in LAA", 3GPP TSG RAN WG1 Meeting #82bis, R1-155253, Agenda: 7.2.3.1, ZTE, Oct. 5-9, 2015, pp. 1-3.
Office Action received for corresponding Vietnamese Patent Application No. 1-2021-06768, dated Jan. 6, 2022, page of Office Action and 1 page of translation available.

* cited by examiner

CONTENTION WINDOW SIZE ADJUSTMENT FEEDBACK

RELATED APPLICATION

This application was originally filed as PCT Application No. PCT/CN2019/085417 on May 2, 2019, which is hereby incorporated in its entirety.

FIELD

Embodiments of the present disclosure generally relate to the field of telecommunication and in particular, to methods, devices, apparatuses and computer readable storage media of for contention window size (CWS) adjustment feedback.

BACKGROUND

Harmonious coexistence between Long Term Evolution with Licensed-Assisted Access (LTE-LAA) and WIFI is a research issue due to deploying LTE to unlicensed spectrum 5 GHz. Listen-before-talk (LBT) scheme works as a requisite in unlicensed spectrum to ensure the fairness among different radio access technologies. For NR-Unlicensed (NRU), TR 38.889 defines LBT with random back-off with a contention window of variable size.

As known, the LBT procedure is a mechanism by which a transmitting entity should apply a clear channel assessment (CCA) check before using the channel and the CCA check time should depend on a random backoff and the contention window size. For CWS adjustment procedure, NR-U may at least consider Code Block Group (CBG) based HARQ-ACK operation and operation on wideband carrier (>20 MHz) on a wideband Band Width Part (BWP). In the wideband BWP, there may be a transport block (TB) scheduled across multiple LBT subbands, while the CWS should be adjusted on a LBT subband basis.

SUMMARY

In general, example embodiments of the present disclosure provide a solution of contention window size (CWS) adjustment feedback.

In a first aspect, there is a first device. The first device comprises at least one processor; and at least one memory including computer program codes; the at least one memory and the computer program codes are configured to, with the at least one processor, cause the first device at least to receive at least one transport block from a second device on a predetermined bandwidth part for a transmission from the second device to the first device, the at least one transport block transmitted in a set of subbands of the predetermined bandwidth part; generate a feedback based on a set of reception states of the at least one transport block in the set of subbands; and transmit the feedback to the second device so that the second device adjusts a contention window size (CWS) for a further transmission from the second device to the first device.

In a second aspect, there is a second device. The second device comprises at least one processor; and at least one memory including computer program codes; the at least one memory and the computer program codes are configured to, with the at least one processor, cause the second device at least to transmit at least one transport block to a first device on a predetermined bandwidth part for a transmission from the second device to the first device, the at least one transport block transmitted in a set of subbands of the predetermined bandwidth part; receive a feedback from the first device, the feedback generated based on a set of reception states of the at least one transport block in the set of subbands; and adjust a contention window size (CWS) for a further transmission from the second device to the first device based on the feedback.

In a third aspect, there is provided a method. The method comprises receiving at least one transport block from a second device on a predetermined bandwidth part for a transmission from the second device to the first device, the at least one transport block transmitted in a set of subbands of the predetermined bandwidth part; generating a feedback based on a set of reception states of the at least one transport block in the set of subbands; and transmitting the feedback to the second device so that the second device adjusts a contention window size (CWS) for a further transmission from the second device to the first device.

In a fourth aspect, there is provided a method. The method comprises transmitting at least one transport block to a first device on a predetermined bandwidth part for a transmission from the second device to the first device, the at least one transport block transmitted in a set of subbands of the predetermined bandwidth part; receiving a feedback from the first device, the feedback generated based on a set of reception states of the at least one transport block in the set of subbands; and adjusting a contention window size (CWS) for a further transmission from the second device to the first device based on the feedback.

In a fifth aspect, there is provided an apparatus comprises means for receiving at least one transport block from a second device on a predetermined bandwidth part for a transmission from the second device to the first device, the at least one transport block transmitted in a set of subbands of the predetermined bandwidth part; means for generating a feedback based on a set of reception states of the at least one transport block in the set of subbands; and means for transmitting the feedback to the second device so that the second device adjusts a contention window size (CWS) for a further transmission from the second device to the first device.

In a sixth aspect, there is provided an apparatus comprises means for receiving at least one transport block from a second device on a predetermined bandwidth part for a transmission from the second device to the first device, the at least one transport block transmitted in a set of subbands of the predetermined bandwidth part; means for generating a feedback based on a set of reception states of the at least one transport block in the set of subbands; and means for transmitting the feedback to the second device so that the second device adjusts a contention window size (CWS) for a further transmission from the second device to the first device.

In a seventh aspect, there is provided a computer readable medium having a computer program stored thereon which, when executed by at least one processor of a device, causes the device to carry out the method according to the third aspect.

In a seventh aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
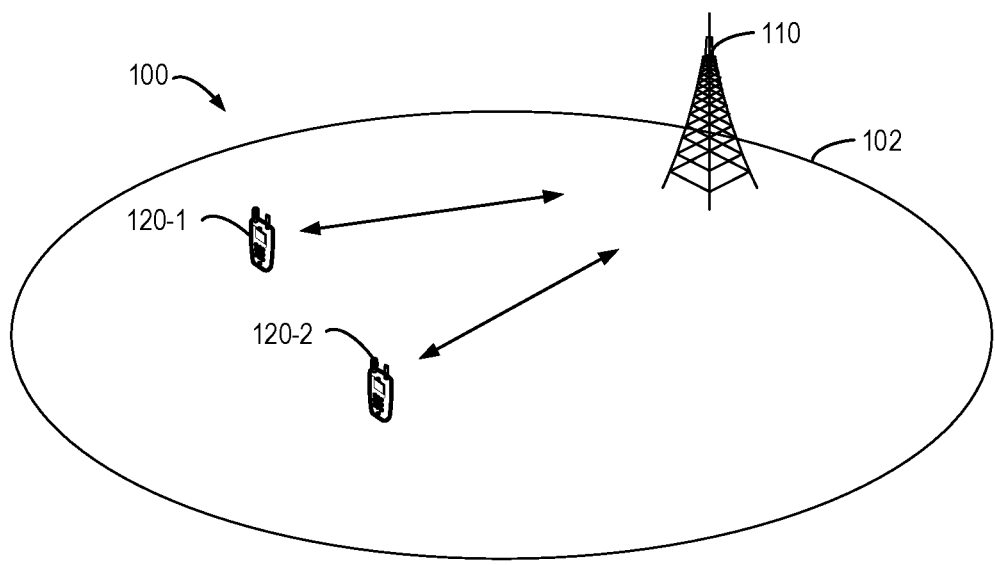
FIG. 1 shows an example communication network in which example embodiments of the present disclosure may be implemented.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 shows an example communication network 100 in which embodiments of the present disclosure can be implemented. The network 100 includes a second device 120 (hereinafter may be referred as to a network device 120) and first devices 110-1 and 110-2 (hereinafter collectively referred to as first devices 110 or individually referred to as a terminal device 110) served by the network device 120. The serving area of the network device 120 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 120.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, the Listen before Talk (LBT) procedure is a mechanism by which a transmitting entity should apply a clear channel assessment (CCA) check before using the channel and the CCA check time should depend on a random backoff and the contention window size. For CWS adjustment procedure, NR-U may at least consider the HARQ-ACK operation and operation on wideband carrier (>20 MHz) on a wideband Band Width Part (BWP).

In LTE-LAA, the CWSs are maintained and updated separately for each 20 MHz carrier. At least for a band where absence of Wi-Fi cannot be guaranteed (e.g. by regulation), it is agreed that NR-U LBT can be performed in units of 20 MHz. The most straightforward solution is that the CWS maintenance is also done separately in each 20 MHz subband. This is the case particularly for the wideband (WB) operation with a primary LBT subband.

For efficient CWS adjustment in NR-U with wideband operation, CWS should be adjusted on a LBT subband (per 20 MHz) basis. However, a single data transport block (TB), comprising of certain number of Code Blocks (CBs), may be transmitted/scheduled across multiple subbands. Therefore, a single HARQ-ACK for a TB covering multiple LBT subbands is insufficient for CWS adjustment. The channel utilization/interference on different sub-bands of a BWP may be different. For example, there is interference resulting in failed decoding of some Code Block Groups (CBGs) on just one LBT subband, the HARQ-ACK will be "NACK" for the whole TB and correspondingly CWS will be increased for all LBT subbands on which the TB is transmitted, which may lead to unnecessary increased delays for the access of the channel.

In addition to TB-based HARQ-ACK feedback, NR may also support CBG based HARQ ACK feedback, where separate HARQ ACKs can be provided for individual CBs or CBGs, i.e. parts of a TB. In principle, the CBG based HARQ-ACK feedback could also assist CWS adjustment in the case described above by providing a finer granularity for HARQ-ACK feedback.

However, this approach has certain drawbacks. For example, CB mapping in NR Rel-15 is done in frequency first, which causes a single CB may typically span over multiple 20 MHz subbands. It may essentially defeats the purpose of using CBG based feedback to distinguish between interference situations on different subbands.

Furthermore, the granularity of CBG based HARQ-ACK feedback is unnecessarily fine (up to 8 CBGs) and CBs are distributed approx. equally between CBGs, which contradicts the purpose of CWS adjustment as well, where only focus on the granularity of 20 MHz and CBs within an LBT sub-band. Configuring 8CBGs to better approximate LBT sub-band split will result in unnecessary signalling overhead. If CBG is configured, the CBG based feedback is applied for all transport blocks.

However, for the CWS adjustment, this is unnecessary overhead, since the adjustment of the CWS only depends on the data received in the reference slot(s), which may be typically located at the start of a Downlink (DL) or an Uplink (UL) burst. Other slots in the DL/UL burst may not be required to be taken into account in CWS maintenance, and therefore also CBG based HARQ-ACK feedback is not needed for those slots.

Therefore, the present disclosure proposes new type of feedback supporting CWS adjustment especially in a case where one or more TBs are mapped onto at least two LBT subbands.

Figure 2:
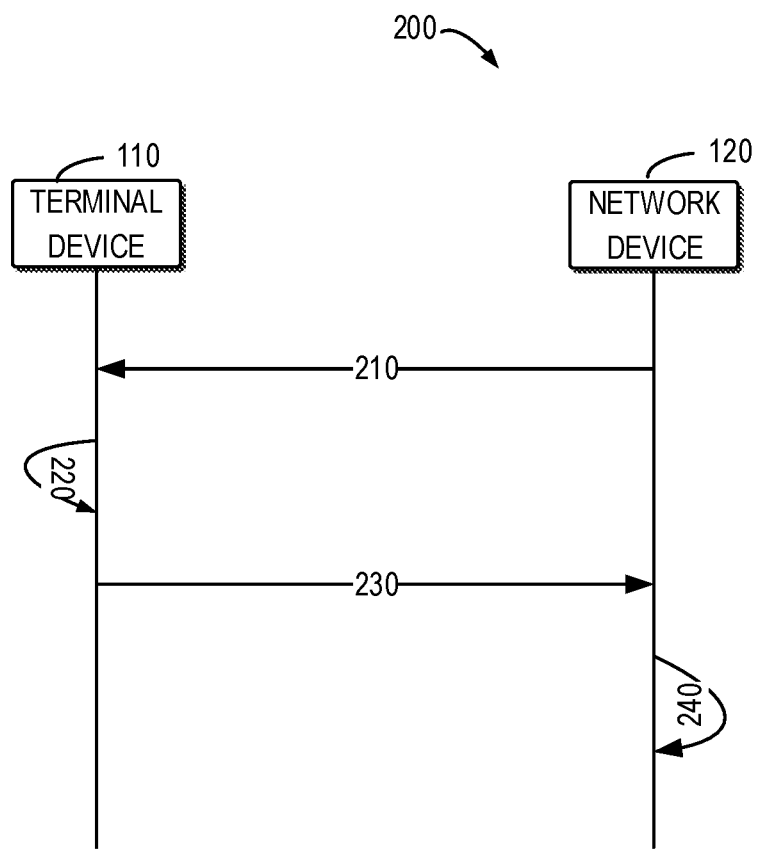
FIG. 2 shows a schematic diagram illustrating a process for CWS adjustment feedback according to example embodiments of the present disclosure.

FIG. 2 shows a schematic diagram of a process 200 for configured grant operation according to example embodiments of the present disclosure. For the purpose of discussion, the process 200 will be described with reference to FIG. 1. The process 200 may involve the terminal device 110 and the network devices 120 as illustrated in FIG. 1.

As shown in FIG. 2, the network device 120 transmits at least one TB to the terminal device 110 on a predetermined BWP. The at least one transport block is transmitted in a set or subset of subbands comprised in predetermined bandwidth part.

As mentioned above, the network device may allocate a predetermined BWP of the wideband for a DL transmission of the TB from the network device 120 to the terminal device 110 while the LBT may be perform in each subbands of 20 MHz. That is, the predetermined BWP may span far beyond the range of LBT subband, i.e. 20 MHz. Therefore, the TB may be transmitted in a plurality of subbands in the predetermined BWP.

Figure 3:
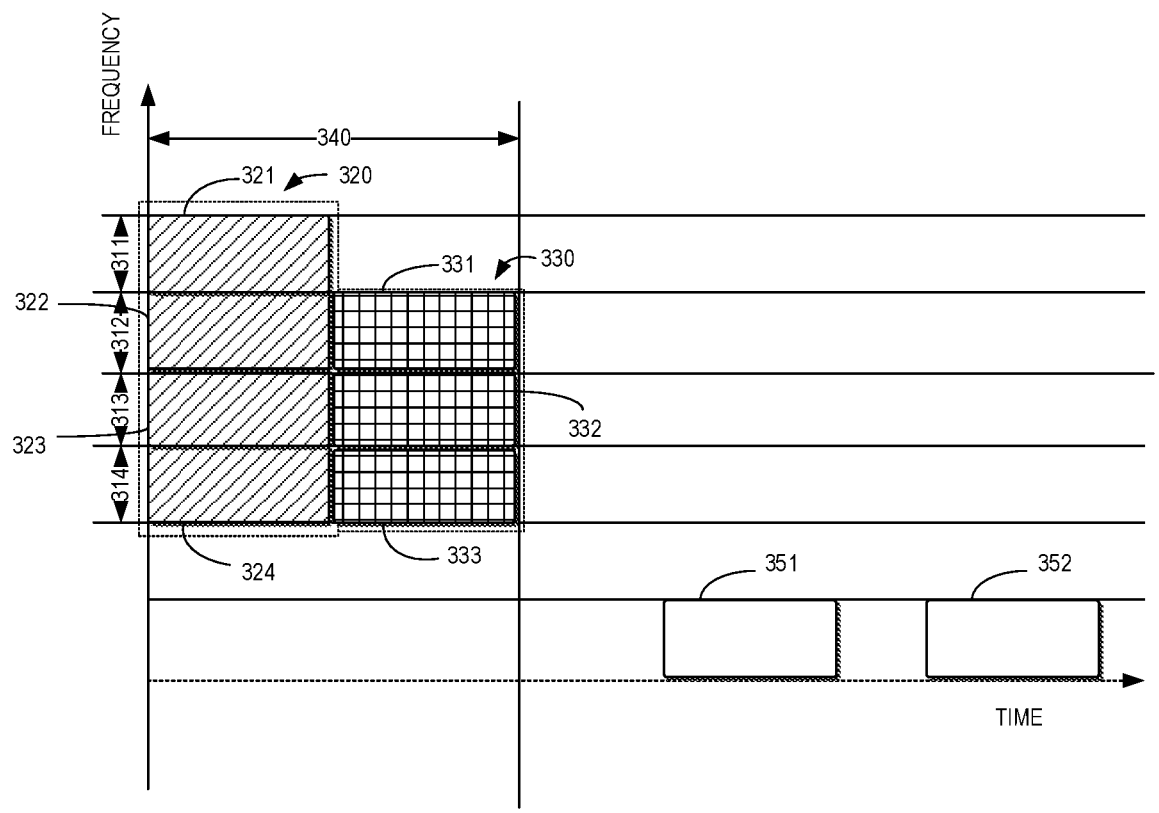
FIG. 3 shows a diagram of an example of a transport block transmitted on a multiple subbands according to some example embodiments of the present disclosure.

FIG. 3 shows a diagram of an example of a TB transmitting on a multiple subbands according to some example embodiments of the present disclosure.

As shown in FIG. 3, there are two TBs 320 and 330 transmitted in the predetermined BWP. For example, TB 320 including blocks 321, 322, 323 and 342 may be transmitted in subbands 311, 312, 313 and 314 of the predetermined BWP and each block may be transmitted in a subband. For example, block 321 is transmitted in the subband 321. FIG. 3 also shows another TB 330 including 331, 332 and 333 which is transmitted in the predetermined BWP. Compared with the TB 320, which is transmitted in all subbands of the predetermined BWP, the TB 330 is only transmitted in a subset of three subbands of the predetermined BWP.

Referring back to FIG. 2, the terminal device 110 may receive the TB in the set of subbands and determine the reception state of the at least one transport block for each subband of the set of subbands. That is, for the received TB, the terminal device 110 may determine a set of reception states of the transport block including the reception state for each subband on which the TB is transmitted.

For example, for the TB shown in FIG. 3, the set of reception states may comprise the reception state of block 321 in the subband 311, the reception state of block 322 in the subband 312, the reception state of block 323 in the subband 313 and the reception state of block 324 in the subband 314.

As shown in FIG. 2, based on the determined set of reception states of the transport block in the set of subbands, the terminal device 110 generates 220 a feedback. The feedback may indicate the reception state of the transport block for each subband.

In some example embodiments, the terminal device 110 may generate a sequence of bits and each bit may indicate whether a reception of the transport block in one of the set of subbands is successful.

For example, for the TB shown in FIG. 3, if the blocks 321-323 are received successfully in subbands 311-313, respectively, and the block 324 is not received successfully in the subband 314, the sequence of bits generated by the terminal device 110 may be represented as "1110," wherein the bit of "1" may represent "ACK" for the reception of TB and the bit of "0" may represent "NACK" for the reception of TB.

The terminal device 110 may generate the feedback based on the sequence of bits, which is generated based on the reception state of the transport block in each of the set of subbands.

For a TB transmitted in all subbands in the predetermined BWP, the length of TB may correspond to the number of the subbands in the predetermined BWP. That is, for example, there are 4 subbands in the predetermined BWP, and then the sequence may comprise 4 bits.

For a TB transmitted only in a part of subbands in the predetermined BWP, as an option, the sequence may only reflect the reception states of subbands on which the TB is transmitted. For example, for the TB 330 shown in FIG. 3, if the blocks 331 and 332 are received successfully in subbands 312 and 313, respectively, and the block 333 is not received successfully in the subband 314, the sequence of bits generated by the terminal device 110 may be represented as "110."

As another option, a default value may be assigned for each subband in the predetermined bandwidth part on which no TB is transmitted. In this case, the sequence may be generated based on the reception states and the default value. For example, if the default value is designated as "1", the sequence for the TB 330 may be "1110," wherein the first "1" is a default value. Alternatively, the default value may also be designated as "0."

In some example embodiments, the terminal device 110 may determine a reference time interval, for example, a reference slot 340 on the predetermined bandwidth part for determining the reception states of the TB. The reference slot may be a certain slot in the UL or DL burst. The UL/DL burst may refer to a set of continuous resources for UL/DL transmission. For example, the reference slot may be the first or the last slot in the UL or DL burst. In alternative embodiments slot may be also a mini-slot or sub-slot. The indication of the reference slot may be obtained for the network device 120 from a previous signaling.

Figure 4:
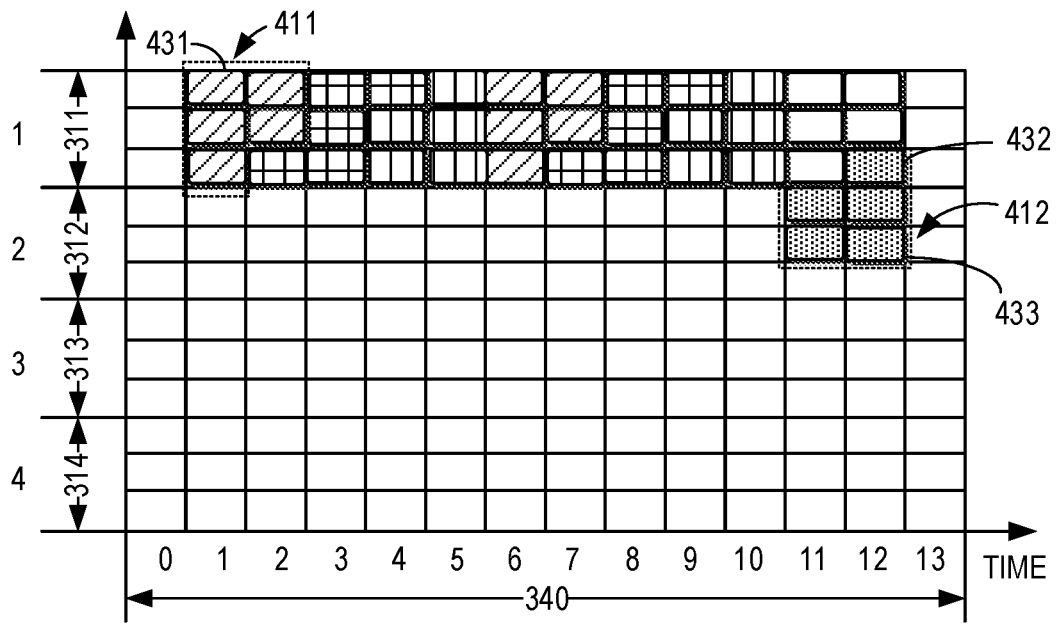
FIG. 4 shows a diagram of an example of a plurality of CBs transmitted on a subband according to some example embodiments of the present disclosure.

As mentioned above, a TB may comprise a plurality of CBGs consist of one or multiple CBs. In this determined reference slot 340, the terminal device 110 may select one or more CBGs in the at least one transport block in the reference slot. FIG. 4 shows a diagram of an example of a plurality of CBs transmitted on a subband according to some example embodiments of the present disclosure.

As shown in FIG. 4, in the subband 311, there are a multiple CBGs (for example, the CBG 411) and each CBG may comprise several CBs (for example, the. CB 431 being one of five CB of a CBG). In some embodiment CBG can be also only one CB. It should be understood that one or more TBs may be transmitted in one subband within the reference slot(s). For determining the interference state in one subband (for example, the subband 311), only the CBGs or CBs in this subband may be taken into consideration. For example, as shown in FIG. 4, the CBG 412 may be transmitted over 2 subbands, i.e. subbands 311 and 312. Therefore, the CBG 412 may not be taken into consideration for determining the reception state in subband 311. In some example embodiments, in the reference slot 340, the CBGs or CBs of a certain TB may be selected for determining the reception state in subband 311. FIG. 4 shows also an embodiment, where CBs are mapped subband first, frequency second, time third, and time direction is reversed between neighboring transmitted subbands.

The terminal device 110 may determine the reception state based on the successful reception rate of the CBGs in one subband or based on the successful reception rate of the CBs in one subband. The successful reception rate may indicate how many CBGs or CBs in this subband have been successful received. If the terminal device 110 determines the successful reception rate of the CBGs in one subband or the successful reception rate of the CBs in one subband exceeds a threshold reception rate, the terminal device 110 may determine the successful reception of the transport block in this subband.

For example, if all CBs or CBGs in the reference slot 340 are "ACK", the terminal device 110 may determine the successful reception. Alternatively, if a certain percentage of CBs or CBGs in the reference slot 340 are "ACK", the terminal device 110 may determine the successful reception. As an option, if at least one CB or CBG in the reference slot 340 is "ACK", the terminal device 110 may determine the successful reception.

As an option, the terminal device 110 may also include more than one sequence of bits as the feedback. For example, the terminal device 110 may generate a first sequence of bits corresponding to the first TB in the reference slot and generate a second sequence of bits corresponding to the second TB in the reference slot. Both of the first and the second sequences of bits may be considered as the feedback.

Back to FIG. 2, the terminal device 110 transmits 230 the feedback to the network device 120.

In some example embodiments, the terminal device 110 may transmit the feedback with a response for the reception of the TB from the terminal device 110 to the network device 120.

In some example embodiments, the terminal device 110 reports the feedback to the network device along with the HARQ-ACK feedback corresponding to at least on TB or TB candidate in the reference slot, following the timing for HARQ that is indicated with a K1 value in the DL assignment scheduling the DL data transport block. Assuming that the reference slot is known by the terminal device 110, when the terminal device 110 is triggered to report HARQ-ACK feedback for at least one TB or TB candidate in such slots, the terminal device 110 will also include the feedback of CWS adjustment into the report.

In some example embodiments, the terminal device 110 may transmit the feedback on the timing specified by the network device 120. The timing and presence of CWS adjustment feedback may be indicated in the DL assignment scheduling the DL data in the reference slots from the network device 120. For example, there may be e.g. a 1-bit indicator in the DL assignment to inform terminal device 110 that for the given DL TB a CWS adjustment feedback should also be included into the UCI (in addition to normal HARQ-ACK feedback).

In some example embodiments, the feedback transmitted along with in the HARQ-ACK codebook associated with e.g. the last transport block transmitted within the reference slots for the terminal device 110. That is, the CWS adjustment feedback is not reported with other HARQ-ACK codebooks associated with earlier TBs in the reference slots.

Now referring back to FIG. 3, in some example embodiments, for the TBs 320 and 330 transmitted in the reference slot 340, the CWS adjustment feedback is determined based on code blocks in TBs 320 and 330. After the terminal device 110 determines the CWS adjustment feedback based on the aforementioned mechanism, it reports the CWS adjustment feedback together with HARQ-ACK feedback in the resources in other slot, for example, the block 351.

In some example embodiments, if the terminal device 110 determines the CWS adjustment feedback only based on the TB 320, the CWS adjustment feedback is multiplexed together with HARQ-ACK feedback for the TB 320. In this example, there is clear one-to-one mapping between the timing of CWS adjustment feedback and the timing of the corresponding HARQ-ACK. For example, the CWS adjustment feedback may report along with the HARQ-ACK in block 351.

In some example embodiments, the CWS adjustment feedback is also determined based on code blocks in TBs 320 and 330. However, the CWS adjustment feedback may be multiplexed only with the HARQ-ACK CB determined by the DCI scheduling TB 330, in block 352. Alternatively, the CWS adjustment feedback could be multiplexed with both HARQ-ACK feedbacks i.e. blocks 351 and 352 on expense of increased overhead.

As shown in FIG. 2, after receiving the feedback from the terminal device 110, the network device 120 adjusts 240 a CWS for a further transmission from the second device to the first device based on the feedback.

In some example embodiments, the network device 120 may determine the reception states of the transport block for each subband in the predetermined BWP. If the network device 120 determines a successful reception of the transport block in a subband, the network device 120 may reset the CWS for the subband. Otherwise, the network device 120 may increase the CWS for the subband.

In some example embodiments, the network device 120 may obtain sequence of bits from the feedback, to determine the reception state of the transport block in each of the subbands.

As mentioned above, a feedback may comprise more than one sequence. In this case, the bit in each sequence corresponding to a same subband may be taken in consideration for determining the reception state of the transport block in this subband.

In this way, a feedback corresponding to interference conditions with a certain subband may be provided for the CWS adjustment and the signalling overhead is significantly reduced.

More details of the example embodiments in accordance with the present disclosure will be described with reference to FIGS. 5-6.

Figure 5:
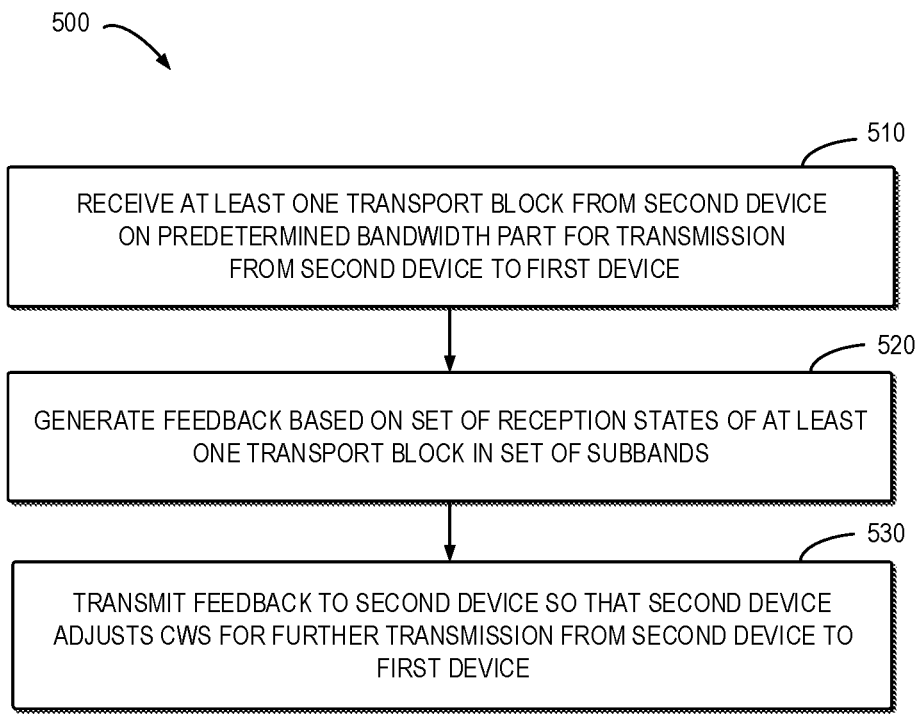
FIG. 5 shows a flowchart of an example method 500 for CWS adjustment feedback according to some example embodiments of the present disclosure.

FIG. 5 shows a flowchart of an example method 500 for configured grant operation according to some example embodiments of the present disclosure. The method 500 can be implemented at the terminal device 110 as shown in FIG. 1. For the purpose of discussion, the method 500 will be described with reference to FIG. 1.

At 510, the terminal device 110 receives at least one transport block from a second device on a predetermined bandwidth part for a transmission from the network device 120 to the terminal device 110, the at least one transport block transmitted in a set of subbands of the predetermined bandwidth part.

At 520, the terminal device 110 generates a feedback based on a set of reception states of the at least one transport block in the set of subbands.

In some example embodiments, the terminal device 110 may determine at least one reference time interval on the predetermined bandwidth part for the transmission. The terminal device 110 may further determine whether there is the at least one transport block received in the at least one reference time interval and if the terminal device 110 determines a reception of the at least one transport block in the at least one reference time interval, the terminal device 110 may generate the feedback.

In some example embodiments, the terminal device 110 may receive an indication of the at least one reference from the network device 120 and determine the at least one reference time interval based on the indication.

In some example embodiments, the terminal device 110 may generate a sequence of bits based on the reception states in the set of subbands, each bit indicating whether a reception of the at least one transport block in one of the set of subbands is successful. The terminal device 110 may further generate the feedback based on the sequence of bits.

In some example embodiments, the terminal device 110 may assign default values for subbands in the predetermined bandwidth part on which no transport block is transmitted and generate the sequence of bits based on the reception states and the default values.

In some example embodiments, the terminal device 110 may select one or more code block groups in the at least one transport block from the at least one transport block transmitted in a same subband in at least one reference time interval and determine a successful reception rate of the selected code block groups. If the terminal device 110 determines that the successful reception rate exceeds a threshold reception rate, the terminal device 110 may determine the successful reception of the at least one transport block.

At 530, the terminal device 110 transmits the feedback to the second device so that the second device adjusts a CWS for a further transmission from the network device 120 to the terminal device 110.

In some example embodiments, the feedback is transmitted along with a response for the reception of the at least one transport block from the terminal device 110 to the network device 120. In some example embodiments, the response comprises a hybrid automatic repeat request acknowledgement of the at least one transport block.

In some example embodiments, the terminal device 110 may receive from the second device an indication of a timing configured for the feedback and transmit the feedback on the timing based on the indication. In some example embodiments, the timing configured for the feedback is a timing for a hybrid automatic repeat request acknowledgement corresponding to the at least one transport block.

Figure 6:
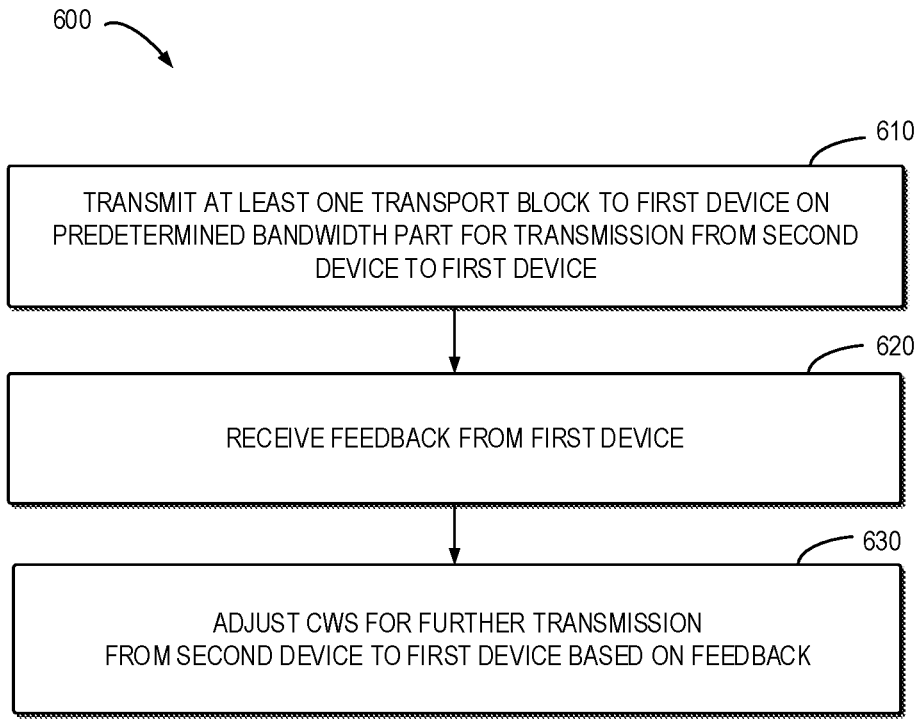
FIG. 6 shows a flowchart of an example method 600 for CWS adjustment feedback according to some example embodiments of the present disclosure.

FIG. 6 shows a flowchart of an example method 600 for configured grant operation according to some example embodiments of the present disclosure. The method 600 can be implemented at the network device 120 as shown in FIG.

1. For the purpose of discussion, the method 600 will be described with reference to FIG. 1.

At 610, the network device 120 transmits at least one transport block to a terminal device 110 on a predetermined bandwidth part for a transmission from the network device 120 to the terminal device 110, the at least one transport block transmitted in a set of subbands of the predetermined bandwidth part.

In some example embodiments, the network device 120 may determine at least one reference time interval in the transmission. The network device 120 may also generate an indication of the at least one reference time interval and transmit the indication to the terminal device 110.

At 620, the network device 120 receives a feedback from the first device, the feedback generated based on a set of reception states of the at least one transport block in the set of subbands.

In some example embodiments, the feedback is transmitted along with a response for the reception of the at least one transport block from the terminal device 110 to the network device 120. In some example embodiments, the response comprises a hybrid automatic repeat request acknowledgement of the at least one transport block.

In some example embodiments, the network device 120 may transmit an indication of a timing configured for the feedback to the terminal device 110 and receive the feedback on the timing based on the indication.

At 630, the network device 120 adjusts a CWS for a further transmission from the network device 120 to the terminal device 110 based on the feedback.

In some example embodiments, the network device 120 may determines the set of reception states of the at least one transport block in the set of subbands from the feedback. If the network device 120 determines a successful reception of the at least one transport block in a first subband of the set of subbands, the network device 120 may reset the CWS for the first subband. If the network device 120 determines an unsuccessful reception of the at least one transport block in a second subband of the set of subbands, the network device 120 may increase the CWS for the second subband.

In some example embodiments, the network device 120 may obtain a sequence of bits from the feedback, each bit indicating whether a reception of the at least one transport block in one of the set of subbands is successful and determine set of reception states based on each bit of the sequence of bits.

In some example embodiments, an apparatus capable of performing the method 500 (for example, implemented at the terminal device 110) may comprise means for performing the respective steps of the method 500. The means may be implemented in any suitable form. For example, the means may be implemented in a circuitry or software module.

In some example embodiments, the apparatus comprises means for receiving at least one transport block from a second device on a predetermined bandwidth part for a transmission from the second device to the first device, the at least one transport block transmitted in a set of subbands of the predetermined bandwidth part; means for generating a feedback based on a set of reception states of the at least one transport block in the set of subbands; and means for transmitting the feedback to the second device so that the second device adjusts a contention window size (CWS) for a further transmission from the second device to the first device.

In some example embodiments, an apparatus capable of performing the method 600 (for example, implemented at the network device 120) may comprise means for performing the respective steps of the method 600. The means may be implemented in any suitable form. For example, the means may be implemented in a circuitry or software module.

In some example embodiments, the apparatus comprises means for transmitting at least one transport block to a first device on a predetermined bandwidth part for a transmission from the second device to the first device, the at least one transport block transmitted in a set of subbands of the predetermined bandwidth part; means for receiving a feedback from the first device, the feedback generated based on a set of reception states of the at least one transport block in the set of subbands; and means for adjusting a contention window size (CWS) for a further transmission from the second device to the first device based on the feedback.

Figure 7:
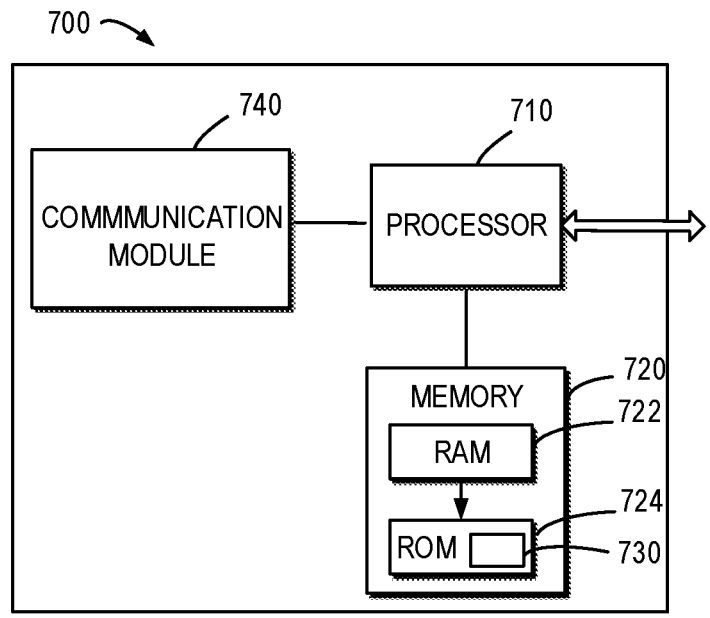
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the terminal device 110 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 1020. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 2 to 6. The embodiments of the present disclosure may also be implemented by hardware or by a combination of software and hardware.

Figure 8:
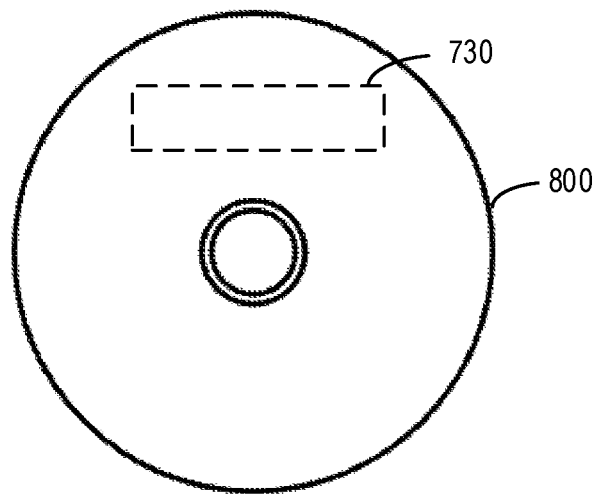
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 2-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory storing instructions that, when executed by the at least one processor, cause the first device at least to:
   receive at least one transport block from a second device on a predetermined bandwidth part for a transmission to the first device, the at least one transport block transmitted in a set of subbands of the predetermined bandwidth part;
   generate at least one feedback based on a set of reception states of the at least one transport block in the set of subbands;
   transmit the at least one feedback to the second device, wherein the at least one feedback is configured to cause the second device to adjust at least one contention window size for a further transmission from the second device to the first device;
   determine the set of reception states of the at least one transport block in the set of subbands; and
   determine a successful reception of the at least one transport block in a subband of the set of subbands in response to a certain percentage of code blocks or code block groups being received successfully.

2. The first device of claim 1, wherein the first device is caused to generate the at least one feedback by:
   determining at least one reference time interval on the predetermined bandwidth part for the transmission;
   determining there is a reception of the at least one transport block received in the at least one reference time interval; and
   in response to the determining the reception of the at least one transport block occurred in the at least one reference time interval, generating the at least one feedback.

3. The first device of claim 2, wherein the first device is caused to determine the at least one reference time interval by:
   receiving, from the second device, an indication of the at least one reference time interval; and determining the at least one reference time interval based on the indication.

4. The first device of claim 1, wherein the first device is caused to generate the at least one feedback by:
   generating a sequence of bits based on the reception states in the set of subbands, each bit indicating whether a reception of the transport block in one of the set of subbands is successful; and
   generating the at least one feedback based on the sequence of bits.

5. The first device of claim 4, wherein the first device is caused to generate the sequence by:
   assigning default values for subbands in the predetermined bandwidth part on which no transport block is transmitted; and
   generating the sequence of bits based on the reception states and the default values.

6. The first device of claim 1, wherein the first device is further caused to:
   select one or more code block groups from the at least one transport block transmitted in a same subband in at least one reference time interval;
   determine a successful reception rate of the selected one or more code block groups exceeds a threshold reception rate; and
   in response to the determining that the successful reception rate exceeds the threshold reception rate, determine the successful reception of the at least one transport block.

7. The first device of claim 1, wherein the at least one feedback is transmitted along with a response for the reception of the at least one transport block from the second device to the first device.

8. The first device of claim 7, wherein the response comprises a hybrid automatic repeat request acknowledgement of the at least one transport block.

9. The first device of claim 1, wherein the first device is caused to transmit the at least one feedback by:
   receiving from the second device an indication of a timing configured for the at least one feedback; and
   transmitting the at least one feedback on the timing based on the indication.

10. The first device of claim 9, wherein the timing configured for the at least one feedback is a timing for a hybrid automatic repeat request acknowledgement corresponding to the at least one transport block.

11. A second device comprising:
   at least one processor; and
   at least one memory storing instructions that, when executed by the at least one processor, cause the second device at least to:
   transmit at least one transport block to a first device on a predetermined bandwidth part for a transmission from the second device, the at least one transport block transmitted in a set of subbands of the predetermined bandwidth part;
   receive at least one feedback from the first device, the at least one feedback generated based on a set of reception states of the at least one transport block in the set of subbands; and
   adjust at least one contention window size for a further transmission from the second device to the first device based on the at least one feedback,
   wherein the second device is caused to adjust the at least one contention window size by:
      determining the set of reception states of the at least one transport block in the set of subbands from the at least one feedback;
      in response to determining a successful reception of the at least one transport block in a first subband of the set of subbands, resetting the at least one contention window size for the first subband; and
      in response to determining an unsuccessful reception of the at least one transport block in a second subband of the set of subbands, increasing the at least one contention window size for the second subband.

12. A method comprising:
   receiving, at a first device, at least one transport block from a second device on a predetermined bandwidth part for a transmission to the first device, the at least one transport block transmitted in a set of subbands of the predetermined bandwidth part;
   generating at least one feedback based on a set of reception states of the at least one transport block in the set of subbands;
   transmitting the at least one feedback to the second device, wherein the at least one feedback is configured to cause the second device to adjust at least one contention window size for a further transmission from the second device to the first device;
   determine the set of reception states of the at least one transport block in the set of subbands; and
   determine a successful reception of the at least one transport block in a subband of the set of subbands in response to a certain percentage of code blocks or code block groups being received successfully.

13. The method of claim 12, wherein generating the at least one feedback comprises:
   generating a sequence of bits based on the reception states in the set of subbands, each bit indicating whether a reception of the at least one transport block in one of the set of subbands is successful; and
   generating the at least one feedback based on the sequence of bits.

14. The method of claim 12, wherein determining the reception states comprising:
   selecting one or more code block groups from the at least one transport block transmitted in a same subband in at least one reference time interval;
   determining a successful reception rate of the selected one or more code block groups exceeds a threshold reception rate; and
   in response to the determining that the successful reception rate exceeds the threshold reception rate, determining the successful reception of the at least one transport block.

15. The method of claim 12, wherein the at least one feedback is transmitted with at least one response for the reception of the at least one transport block from the second device to the first device.

16. The method of claim 15, wherein the at least one response comprises a hybrid automatic repeat request acknowledgement of the at least one transport block.

17. The method of claim 12, wherein transmitting the at least one feedback comprises:
   receiving from the second device an indication of a timing configured for the at least one feedback; and
   transmitting the at least one feedback on the timing based on the indication.

18. The method of claim 17, wherein the timing configured for the at least one feedback is a timing for a hybrid automatic repeat request acknowledgement corresponding to the at least one transport block.

19. A method comprising:

transmitting, to a first device from a second device, at least one transport block on a predetermined bandwidth part for a transmission from the second device, the at least one transport block transmitted in a set of subbands of the predetermined bandwidth part;

receiving, by the second device, at least one feedback from the first device, the at least one feedback generated based on a set of reception states of the at least one transport block in the set of subbands; and adjusting, by the second device, at least one contention window size for a further transmission from the second device to the first device based on the at least one feedback, wherein the second device is caused to adjust the at least one contention window size by:

determining the set of reception states of the at least one transport block in the set of subbands from the at least one feedback;

in response to determining a successful reception of the at least one transport block in a first subband of the set of subbands, resetting the at least one contention window size for the first subband; and in response to determining an unsuccessful reception of the at least one transport block in a second subband of the set of subbands, increasing the at least one contention window size for the second subband.

* * * * *